(No Model.)
H. WOODWARD.
BATTERY AND BATTERY PLATE.
No. 347,754. Patented Aug. 17, 1886.
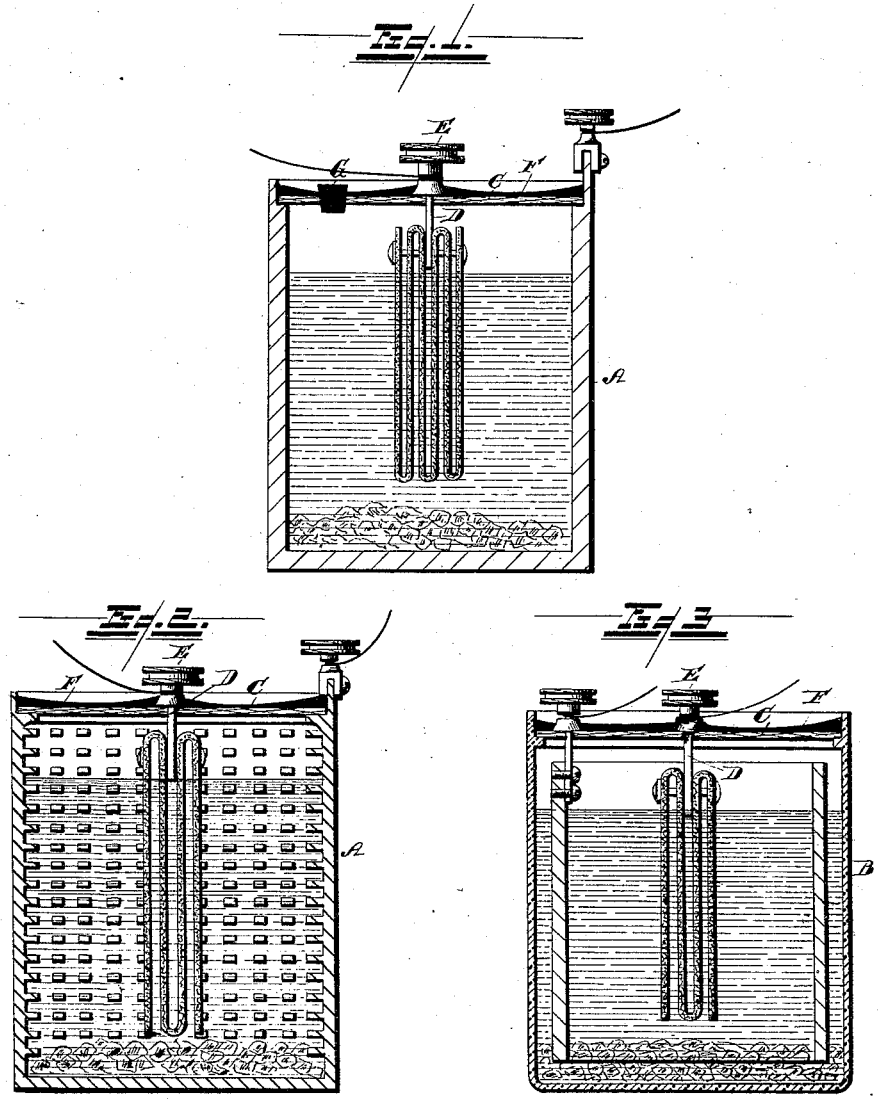
WITNESSES
INVENTOR
Attorney

UNITED STATES PATENT OFFICE.

HENRY WOODWARD, OF SHEPHERDS BUSH, COUNTY OF MIDDLESEX, ENGLAND.

BATTERY AND BATTERY-PLATE.

SPECIFICATION forming part of Letters Patent No. 347,754, dated August 17, 1886.

Application filed January 17, 1885. Serial No. 153,165. (No model.)

*To all whom it may concern:*

Be it known that I, HENRY WOODWARD, of Shepherds Bush, county of Middlesex, England, have invented a new and useful Improvement in Batteries and Battery-Plates; and I declare the following to be a full, clear, and exact description of the same, such as will enable others skilled in the art to which it pertains to make and use it, reference being had to the accompanying drawings, which form a part of this specification.

My invention relates to an improved battery; also to a novel element for use with a battery, and also to the process employed for casting the said novel element, and also to the process employed for simultaneously casting said element and rendering it malleable, so that it may be bent or curled upon itself when desirable.

In the drawings, Figure 1 illustrates a plain primary battery with a cast-iron cell, smooth upon the interior and constituting one of the battery elements, the other element being the zinc casting. Fig. 2 represents the cell of cast-iron with its interior provided with nodules or warts to increase the surface exposure, the other element being zinc. Fig. 3 represents the cast-iron element within a glass or vulcanite or similar exterior cell, the cast-iron element being either plain or noduled.

In carrying out my invention I cast the lead, zinc, or other metal or alloys of metals into porous or sponged plates, blocks, slabs, or other shapes, in the manner which I will now describe.

I make a mold of the size and shape necessary for the said element, and into this I place a layer of granulated salt, the granules being of the size to produce any desired size of interstices in the element. I have found the coarse grades of table-salt to produce very satisfactory results for ordinary battery elements. Over this layer of salt I sprinkle the flour of resin. Then I pour over the salt a thin layer of molten metal. I have found it convenient to use a ladle with a few small perforations through which the metal may flow, and pass this to and fro over the salt until there is produced a thin and uniform layer of the metal. I then place another layer of salt and flour of resin upon this coating of metal, and again repeat with a covering of molten metal. I repeat this process until the block, slab, cylinder, or other shape of element is of the dimensions required. The metal is then removed from the mold and the salt is dissolved out with water. This leaves the element in a spongy or porous condition, presenting an amount of surface hitherto unattainable, making them especially suitable for the purposes of primary and secondary batteries. These elements are amalgamated in the ordinary way before being used.

The pouring of the melted metal through the minute perforations, as described, I have found to conduce very greatly toward the production of a spongy mass, and that the result is better than when the metal is simply poured from a ladle into the mold.

For the other element I generally employ, for ordinary batteries, simply a plain iron cell, as shown at A. The cell may, however, be of glass, vulcanite, or other similar substance, as shown at B. Where greater quantity is desired, the interior of the cell or the surface of the iron element may be provided with nodules or warts, to increase its surface exposure. The iron element may be cast in porous form by pursuing the same process above described, and may be so employed when it is to be introduced within an exterior cell of glass, vulcanite, &c. The fumes of the resin serve to reduce the brittleness of the zinc, and add greatly to the duration of the element.

I prefer to cover the top of the cell with any suitable insulate, C—as, for instance, hard rubber. Through this I insert an attachment for the zinc or other suspended element, D, and suitable binding-screw, E, is provided in the usual manner.

In charging the battery I use a solution of common potash. I have generally used about a pint and a half of water to a pound of potash (more or less) and a small quantity of oxide of copper. I place the oxide of copper in the bottom of the cell sufficiently to cover it well over, adding the attacking liquid, as above; or for an ordinary small battery of a size, say, about two and one-half by four by four and one-half inches, it might be ready charged with a dry package of, say, three-quarters of a pound of potash, and about two ounces of oxide of copper, requiring thereafter only to be filled with water. I generally seal the cover with asphaltum or equivalent, as shown at F, and provide an opening closed with a cork or plug, G, for convenience of filling.

For all the purposes for which primary and secondary batteries are applicable, this invention will be found of the highest importance. It possesses great electro-motive force, is wholly or substantially inactive upon an open circuit, and its lasting quality is very great. The primaries are therefore well adapted for charging secondary batteries. Where a zinc or lead element is not designed to be subsequently bent, the flour of resin may be omitted in the process. The salt will serve to produce a porous cast-metal element without the employment of the resin.

What I claim is—

1. A battery in which cast-iron is employed as one of the elements, the other element being a porous one made of zinc cast in connection with granular salt, substantially as described.

2. A battery in which cast-iron is employed as one of the elements, the other element being a porous one made of zinc cast in connection with granular salt and flour of resin, substantially as described.

3. The process herein described of casting a battery element in porous form, consisting of the employment of granular salt and flour of resin, the same being incorporated with the molten metal, and the salt subsequently dissolved out, substantially as described.

In testimony whereof I sign this specification in the presence of two witnesses.

HENRY WOODWARD.

Witnesses:
N. S. WRIGHT,
M. B. O'DOGHERTY.